United States Patent [19]
Kniepkamp

[11] 3,819,432
[45] June 25, 1974

[54] METHOD OF PRODUCING SCHOTTKY CONTACTS

[75] Inventor: Hermann Kniepkamp, Munich, Germany

[73] Assignee: Siemens Aktiengesellschaft, Berlin & Munich, Germany

[22] Filed: Nov. 22, 1971

[21] Appl. No.: 200,900

[30] Foreign Application Priority Data

Nov. 20, 1970 Germany............................ 2057204

[52] U.S. Cl......................... 156/11, 156/13, 156/16, 156/17

[51] Int. Cl............................. C23f 1/02, H01l 7/50

[58] Field of Search ....................... 156/3, 11, 17, 13

[56] References Cited

UNITED STATES PATENTS

| | | | |
|---|---|---|---|
| 3,094,489 | 6/1963 | Barnes | 252/79.2 |
| 3,368,124 | 2/1968 | Ditrick | 317/235 |
| 3,423,205 | 1/1969 | Skaggs et al. | 96/36.2 |
| 3,597,667 | 8/1971 | Horn | 317/235 |

OTHER PUBLICATIONS

IBM Technical Disclosure Bulletin, Vol. 13, No. 4, Sept. 1970, Sputter Etching Process, p. 884.

IBM—Al Etch Technique, Kulkarni, Vol. 14, No. 11 April 1972, p. 3406.

*Primary Examiner*—William A. Powell
*Attorney, Agent, or Firm*—Hill, Gross, Simpson, Van Santen, Steadman, Chiara & Simpson

[57] ABSTRACT

Method of producing metal-semiconductor contacts (Schottky contacts) with precisely defined and preferably relatively small areas by uniformly coating a semiconductor surface with a layer of chromium, coating a layer of aluminum in a pattern corresponding to the desired contacts onto the chromium layer and etching the uncoated chromium layer areas with hydrochloric acid having a concentration of at least about 1 percent until corresponding areas of the semiconductor surface are exposed. The so-formed plurality of contacts on a semiconductor sample can be divided into individual components each having at least one such contact. Connection wires or the like are attachable directly to the aluminum area by thermocompression or ultra-sonic bonding.

1 Claim, 3 Drawing Figures

INVENTOR
Hermann Kniepkamp
BY
Hill, Sherman, Meroni, Gross & Simpson
ATTYS.

METHOD OF PRODUCING SCHOTTKY CONTACTS

BACKGROUND OF THE INVENTION

1. Field of the Invention

The invention relates to production of chromium layers with precisely defined areas and more particularly to the production of layers with small areas for metal-semiconductor contacts (Schottky contact) which include chromium on a semiconductor sample.

2. Prior Art

It is known that chromium is a preferred material for the production of metal-semiconductor contacts, particularly for semiconductors comprised of Group III, Sub-Group A, Group V, Sub-Group A compounds (of the Periodic Chart of the Atoms). A preferred example from these compounds is gallium arsenide. In forming metal-semiconductor contacts, so-called Schottky contacts, it is important that no intermediate layers, such as an oxygen layer or the like, are present between the semiconductor surface and the applied metal. Such intermediate layers change the quantum mechanical conditions of such a contact in a very decisive manner. While other contact materials known for Schottky contacts are to deposit only in a vacuum in the order of $10^{-9}$ Torr to prevent such intermediate layer, chromium can be deposited in a vacuum of about $10^{-6}$ Torr. The primary reaaon for this peculiarity is that chromium has an extraordinary high affinity for oxygen. Any oxygen coating present on the semi-conductor material after the conventional heating process in a vacuum of $10^{-6}$ Torr is chemically bound by the chromium.

As advantageous as chromium is for the production of Schottky contacts, it is widely used because of the extreme difficulty in producing precisely defined areas of chromium layer, particularly layers of very small areas or strip-like areas comprising closely adjacent contacts. However, metal-semiconductor contacts of such structure are highly desirable, for instance in integrated circuit applications (IC techniques). In such applications, distances between the edges of surfaces of two or more metal-semiconductor contact areas must be at least as small as about 1 $\mu$m or less. This indicates the strict tolerances required for the sharpness of the edges of the contact.

Generally, precisely defined areas on surface of a material are produced by photo-etch methods wherein a pattern of the desired structure of areas is provided by means of selective exposure and dissolution of nonexposed areas of a photo-sensitive etch-resistant material (i.e. a photo-resist) and etching of the exposed material surfaces. However, such photo-etching methods cannot be used for producing precisely defined chromium areas because chromium cannot be etched only in precisely defined areas.

The instant invention provides methods of producing precise metal-semiconductor contacts with precisely defined areas that include chromium on a semiconductor sample, which overcomes the above and additional prior art drawbacks.

SUMMARY OF THE INVENTION

The invention provides for the production of, relatively small metal-semiconductor contacts (Schottky contacts) which comprise precisely defined metal-areas composed of, for example, a semiconductor substrate of a III–V-compound, such as gallium, arsenide, a chromium layer and an aluminum layer. Feed-line wires or the like are attachable, as by thermo-compression or ultra-sonic bonding, directly to the aluminum layer.

In accordance with the principles of the invention, a semiconductor substrate is first substantially uniformly coated with a layer of chromium, as by evaporation in a vacuum of about $10^{-6}$ Torr and then the chromium layer is coated with a layer of aluminum in a pattern corresponding to the desired contacts. The areas of the chromium layer not coated with aluminum are then etched with hydrochloric acid having a concentration of at least 1 percent.

In one embodiment, the aluminum layer is substantially uniformly coated on to the chromium layer and a resist layer is provided on the aluminum layer corresponding to the desired contact areas while the other areas of the aluminum area are exposed. These exposed aluminum areas are etched with phosphoric acid having a concentration of about 85 percent until corresponding chromium layer areas are exposed. The exposed chromium layer areas are then etched with hydrochloric acid having a concentration of at least 1 percent until the corresponding semiconductor surface areas are exposed.

In another embodiment, the aluminum layer is selectively applied, as by a mask, in a pattern so that the coated aluminum layer areas correspond to the desired contacts. The exposed chromium layer areas are then etched with hydrochloric acid until corresponding semiconductor surfaces are exposed.

DESCRIPTION OF THE PREFERRED EMBODIMENTS

Figure 1:
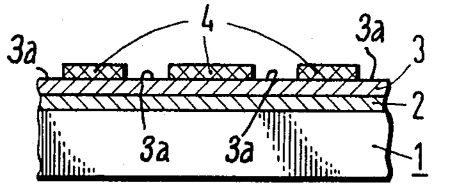
FIG. 1 is an essentially diagrammatic partial elevational view of a sample being formed with a plurality of contacts in accordance with one embodiment of the invention.

The principles of the invention provide that in a structure comprised of a layer of chromium and a superimposed layer of aluminum, the more or less inert chromium layer is etchable with hydrochloric acid. As is known, for example from Solid State Technology, Vol. 12, (1969) pages 49–52, a chromium layer on glass can be etched by hydrochloric acid if either a rod of aluminum or zinc contacts the chromium layer in the acid or if the chromium layer is galvanically connected with a zinc or aluminum electrode that is submerged into the acid.

In accordance with the invention, a galvanic element is provided between an aluminum and a chromium layer when submerged in hydrochloric acid. The electrical conductivity of a semiconductor sample is sufficient to insure that no difficulties are encountered in the complete and precise removal of any surface area of a chromium layer that is not covered by an aluminum layer, even when fairly large surface areas are being etched.

In its broader aspects, the invention includes providing a chromium layer onto a semiconductor sample, such as one composed of gallium arsenide. The chromium layer is applied uniformly, as by evaporation, onto a surface of the semiconductor in a vacuum of about $10^{-6}$ Torr. Chromium layer thicknesses of about 20 to 100 mm (nano meters) are preferable for Schottky contacts and a chromium layer of about 50 nm is especially preferred. A layer of aluminum is then provided onto the chromium layer in a pattern corresponding to the desired contacts. The uncoated or exposed chromium layer areas are then etched with hydrochloric acid having a concentration of at least 1 percent until the corresponding semiconductor surface areas are exposed. In this manner, the semiconductor sample having a plurality of Schottky contacts thereon is produced. Such a sample may be used directly in integrated circuits or may be divided into individual elements each of which have at least one Schottky contact thereon. Feed-line wires or the like are attached directly to the aluminum layer of the contacts.

In one specific embodiment of the invention, the desired pattern of aluminum is provided on the chromium layer by first uniformly coating an aluminum layer onto the chromium layer and then overcoating the aluminum layer with a resist (a photo-sensitive etch-resistant lacquer or the like) material. The resist layer is then selectively exposed to light whereby the exposed resist layer areas correspond to the desired contacts and the non-exposed resist layer areas are removed, as by selective solvents for such non-exposed resist material to expose corresponding areas of the aluminum layer. Then the exposed aluminum areas are etched with phosphoric acid having a concentration of about 85 percent until corresponding areas of the chromium layer are exposed. These exposed chromium areas are then etched with a hydrochloric acid having a concentration of at least about 1 percent and preferably about 6 percent until corresponding areas of the semiconductor surface are exposed. Thereafter, the exposed resist layers can be removed by a suitable solvent to expose the underlying aluminum surfaces, which may then be attached directly to feed-line wires or the like.

In another specific embodiment of the invention, the desired pattern of aluminum is provided by masking parts of the chromium layer so that the exposed chromium layer areas correspond to the desired contacts. Aluminum is then evaporated onto the exposed chromium layer areas and, after unmasking the selected parts of the chromium layer, these unmasked chromium layer parts are etched with hydrochloric acid until corresponding areas of the semiconductor surface are exposed. The specific means of carrying out this embodiment of the invention comprises positioning a suitable mask having the desired contact pattern perforated therethrough, onto the chromium layer and then evaporating aluminum onto the mask and noncovered areas of the chromium layer. The mask is then removed to expose the uncovered chromium areas, which are then etched with hydrochloric acid as set forth above. Compared with direct evaporation of chromium areas through a mask, this embodiment provides formed chromium structures on a semiconductor which can be contacted without further adjusting work.

The thickness of the aluminum layer in all embodiments is about 50 to 150 nm (nano meters) and preferably is about 50nm.

In accordance with the invention, any required feed-line wires or the like (for example composed of gold) are attached directly to the aluminum layer of a formed contact that includes an underlayer of chromium. Preferred methods of attachment include thermo-compression and ultra-sonic bonding.

Referring now to the drawings, wherein like reference numerals refer to like elements, FIG. 1 shows a portion of a relatively large semiconductor sample 1, such as a disk or the like whereon a plurality of distinct Schottky contacts having chromium on the semiconductor are being formed by one embodiment of the invention. A layer 2 of chromium is evaporated onto a surface of the semiconductor sample 1. Then a layer 3 of aluminum is evaporated onto the layer 2. The aluminum layer 3 is then subjected to a photo-etch method whereby a patterned layer of an etchresistant material is applied to the aluminum layer. In a known manner, a photo-sensitive etch-resistant lacquer is selectively exposed to light to form exposed resist areas 4, while the non-exposed areas thereof are dissolved by suitable solvents. The exposed resist areas 4 cover the aluminum layer in those areas where Schottky contacts are desired, i.e., where an area of chomium is supposed to remain on the semiconductor member 1. Thereafter, the exposed aluminum areas **3*a* are etched with a phosphoric acid (having a concentration of about 85 percent) until the corresponding areas of the chromium layer are exposed. Then the exposed chromium layers are etched with hydrochloric acid (having a concentration of at least 1 percent) until corresponding areas of the semiconductor surface are exposed. Because of the galvanic element provided by this arrangement, the etching process is very precise and low tolerances are readily achievable. The exposed resist areas 4** are then removed by a suitable solvent and the plurality of Schottky contacts are ready for use or they can be divided into discrete elements each having at least one Schottky contact thereon.

Figure 2:
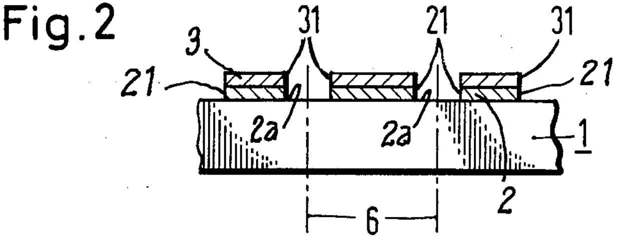
FIG. 2 is an essentially diagrammatic partial elevational view of a sample being formed with a plurality of contacts in accordance with another embodiment of the invention.

FIG. 2 also illustrates the formation of Schottky contacts on a semiconductor sample 1, but by another embodiment of the invention. Chromium is evaporated in a vacuum onto a surface of the semiconductor 1 until a substantially uniform chromium layer 2 is formed thereon. Then a mask having a perforated pattern corresponding to the desired pattern of Schottky contacts is positioned on the chromium layer 2 and aluminum is evaporated onto the exposed chromium areas until a substantially uniform aluminum layer 3 is formed thereon. After removal of the mask, the uncovered (i.e. uncoated) chromium layer areas **2*a* are etched with hydrochloric acid until the corresponding semiconductor areas are exposed. After etching, only the desired chromium contact surface parts 21 and overlaying aluminum surface parts 31 remain on the semiconductor 1. Connection wires are attachable directly to the aluminum surface parts 31**, preferably by thermo-compression or ultra-sonic bonding.

In a known manner, the formed semiconductor sample with a plurality of Schottky contacts thereon is divided or separated into a desired number of individual components each having at least one Schottky contact thereon, for example as indicated along the phantom line 6.

Figure 3:
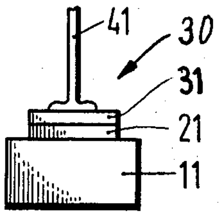
FIG. 3 is an essentially diagrammatic elevational view of a contact formed in accordance with the principles of the invention, bonded to a wire.

FIG. 3 illustrates a semiconductor component element 30 having a Schottky contact thereon. Element 30 consists of a semiconductor sample 11, a chromium layer with a precisely defined area 21, an overlying aluminum layer 31 and a connection wire 41 attached to the aluminum layer as described above.

Modifications, variations, and changes may be made to the described embodiments without departing from the spirit and scope of the novel concepts of the invention.

I claim:

1. A method of producing metal-semiconductor contacts comprised of precisely defined and relatively small metal areas that include chromium on a gallium arsenide semiconductor member, comprising the sequential steps of: (1) substantially uniformly coating a gallium arsenide semiconductor surface with a layer of chromium; (2) substantially uniformly coating the chromium layer with a layer of aluminum; (3) applying a layer of a photo-sensitive etch-resistant material onto the aluminum layer, selectively exposing areas of said etch-resistant material to light so that the exposed areas thereof correspond to the desired contacts and removing the areas of non-exposed etch-resistant material to expose corresponding aluminum areas; (4) etching the exposed aluminum layer areas with phosphoric acid having a concentration of about 85 percent to expose corresponding chromium layer areas; and (5) etching the exposed chromium layer areas with hydrochloric acid having a concentration of at least 1 percent to expose corresponding gallium arsenide semiconductor surface areas.

* * * * *